US008863264B2

(12) United States Patent
Ishizaka

(10) Patent No.: US 8,863,264 B2
(45) Date of Patent: Oct. 14, 2014

(54) IMAGE FORMING APPARATUS, CONTROLLING METHOD AND PROGRAM

(75) Inventor: Asami Ishizaka, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 13/205,102

(22) Filed: Aug. 8, 2011

(65) Prior Publication Data

US 2012/0047567 A1   Feb. 23, 2012

(30) Foreign Application Priority Data

Aug. 20, 2010   (JP) ................................ 2010-185222

(51) Int. Cl.
| G06F 17/30 | (2006.01) |
| G06F 21/84 | (2013.01) |
| G06F 21/31 | (2013.01) |
| G06F 15/16 | (2006.01) |

(52) U.S. Cl.
CPC ........ *G06F 21/31* (2013.01); *G06F 2221/2145* (2013.01); *G06F 21/84* (2013.01)
USPC .................................. 726/8; 713/184; 726/27

(58) Field of Classification Search
CPC ... G06F 17/30132; G06F 21/30; G06F 21/31; G06F 21/34; G06F 21/45; G06F 21/84; G06F 3/1285
See application file for complete search history.

(56) References Cited

U.S. PATENT DOCUMENTS

| 6,441,918 | B1 * | 8/2002 | Hori .............................. 358/1.16 |
| 6,480,958 | B1 * | 11/2002 | Harrington ................... 713/184 |
| 6,832,083 | B1 * | 12/2004 | Oba et al. .................. 455/412.1 |
| 7,404,204 | B2 * | 7/2008 | Davenport et al. ............... 726/8 |
| 7,664,956 | B2 * | 2/2010 | Goodman ..................... 713/176 |
| 8,576,422 | B2 * | 11/2013 | Kimura ........................ 358/1.14 |
| 8,610,923 | B2 * | 12/2013 | Takeshita ..................... 358/1.15 |
| 8,613,063 | B2 * | 12/2013 | Nishida ............................ 726/7 |
| 8,639,948 | B2 * | 1/2014 | Browning .................... 713/193 |
| 2006/0265740 | A1 * | 11/2006 | Clark et al. ....................... 726/8 |
| 2007/0047549 | A1 * | 3/2007 | Park ............................. 370/392 |
| 2007/0220269 | A1 * | 9/2007 | Suzuki ......................... 713/182 |
| 2009/0284779 | A1 * | 11/2009 | Isshiki ......................... 358/1.13 |
| 2010/0050247 | A1 * | 2/2010 | Hashimoto ..................... 726/10 |

FOREIGN PATENT DOCUMENTS

| EP | 1953599 A1 * | 8/2008 | ............. G03G 15/00 |
| JP | 2009-065288 A | 3/2009 | |

OTHER PUBLICATIONS

Hara, JP 2009-065288 A, Publication Date: Mar. 26, 2009, Ricoh, Translation from the JPO website and is a machine translation of the Japanese Patent Document.*

* cited by examiner

*Primary Examiner* — Kaveh Abrishamkar
*Assistant Examiner* — James J Wilcox
(74) *Attorney, Agent, or Firm* — Fitzpatrick, Cella, Harper & Scinto

(57) ABSTRACT

There is provided a system in which, even if cache data of a user is not held in a multifunction machine, the relevant user can log in to the multifunction machine in a case where the relevant user is approved by a user of which the cache data has been held in the multifunction machine.

9 Claims, 17 Drawing Sheets

FIG. 10

AUTHENTICATION TABLE

| CARD INFORMATION 1001 | USER NAME 1002 | PASSWORD 1003 | DATE AND TIME 1004 |
|---|---|---|---|
| ABC12345 | USER1 | PASS1 | yyyy/mm/dd |
| AC5B4321 | USER2 | PASS2 | yyyy/mm/dd |
| ACC67890 | USER3 | PASS3 | yyyy/mm/dd |
| ... | ... | ... | ... |

FIG. 11

CACHE DATA TABLE

| CARD INFORMATION 1101 | USER NAME 1102 | AUTHENTICATION DATE AND TIME 1103 | REGISTRATION FLAG 1104 | APPROVAL CARD INFORMATION 1105 |
|---|---|---|---|---|
| ABC12345 | USER1 | yyyy/mm/dd | 1 | |
| AC5B4321 | USER2 | yyyy/mm/dd | 1 | |
| ACC67890 | USER3 | yyyy/mm/dd | 0 | ABC12345 |
| ... | ... | ... | ... | ... |

FIG. 12

BACKUP FILE

| CARD INFORMATION 1201 | USER NAME 1202 | AUTHENTICATION DATE AND TIME 1203 |
|---|---|---|
| ABC12345 | USER1 | yyyy/mm/dd |
| AC5B4321 | USER2 | yyyy/mm/dd |
| ... | ... | ... |

FIG. 13

CACHE DATA MANAGEMENT SETTING FILE

| EXPIRATION DATE FOR USER OF FLAG "0" | EXPIRATION DATE FOR USER OF FLAG "1" | BACKUP PROCESSING TIME | CACHE UPPER LIMIT NUMBER |
|---|---|---|---|
| ○ DAYS | △ DAYS | □ TIME | × PERSONS |

1301 — EXPIRATION DATE FOR USER OF FLAG "0"
1302 — EXPIRATION DATE FOR USER OF FLAG "1"
1303 — BACKUP PROCESSING TIME
1304 — CACHE UPPER LIMIT NUMBER

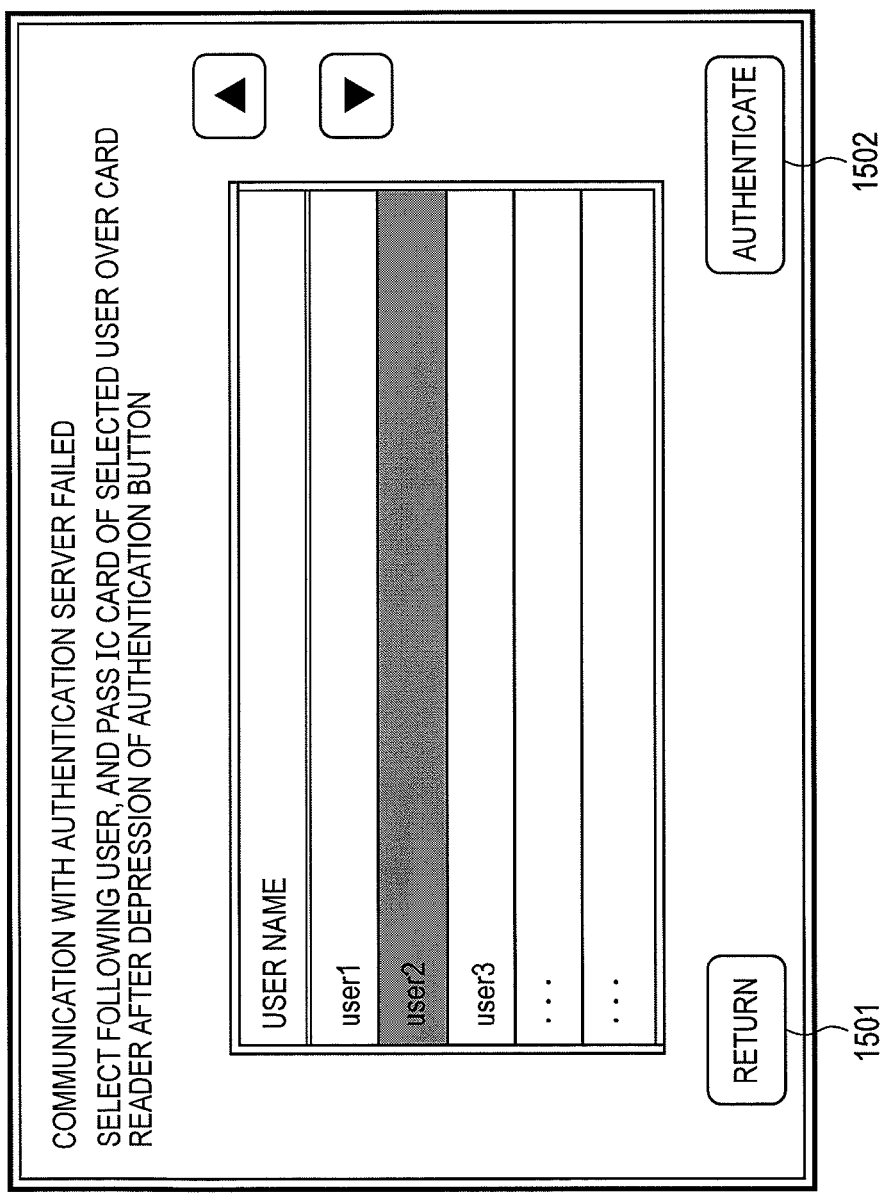

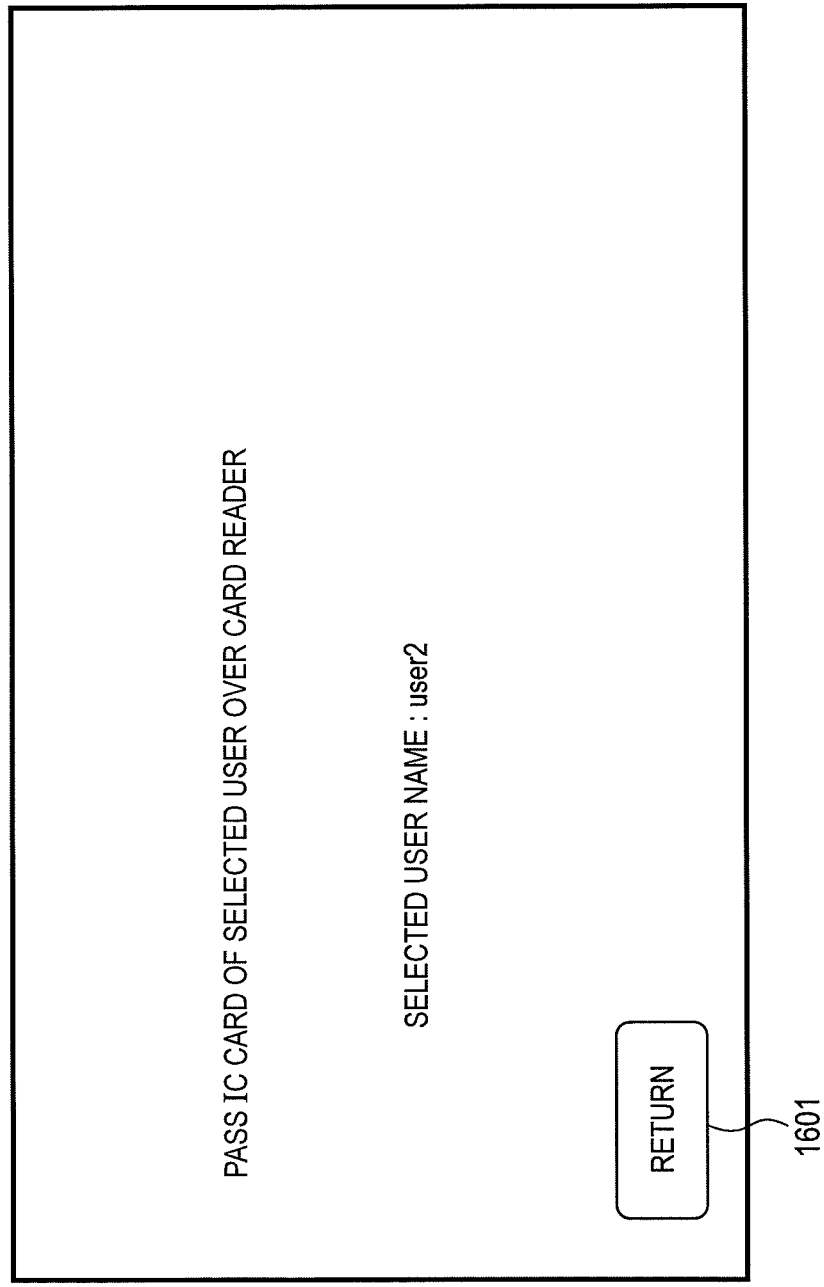

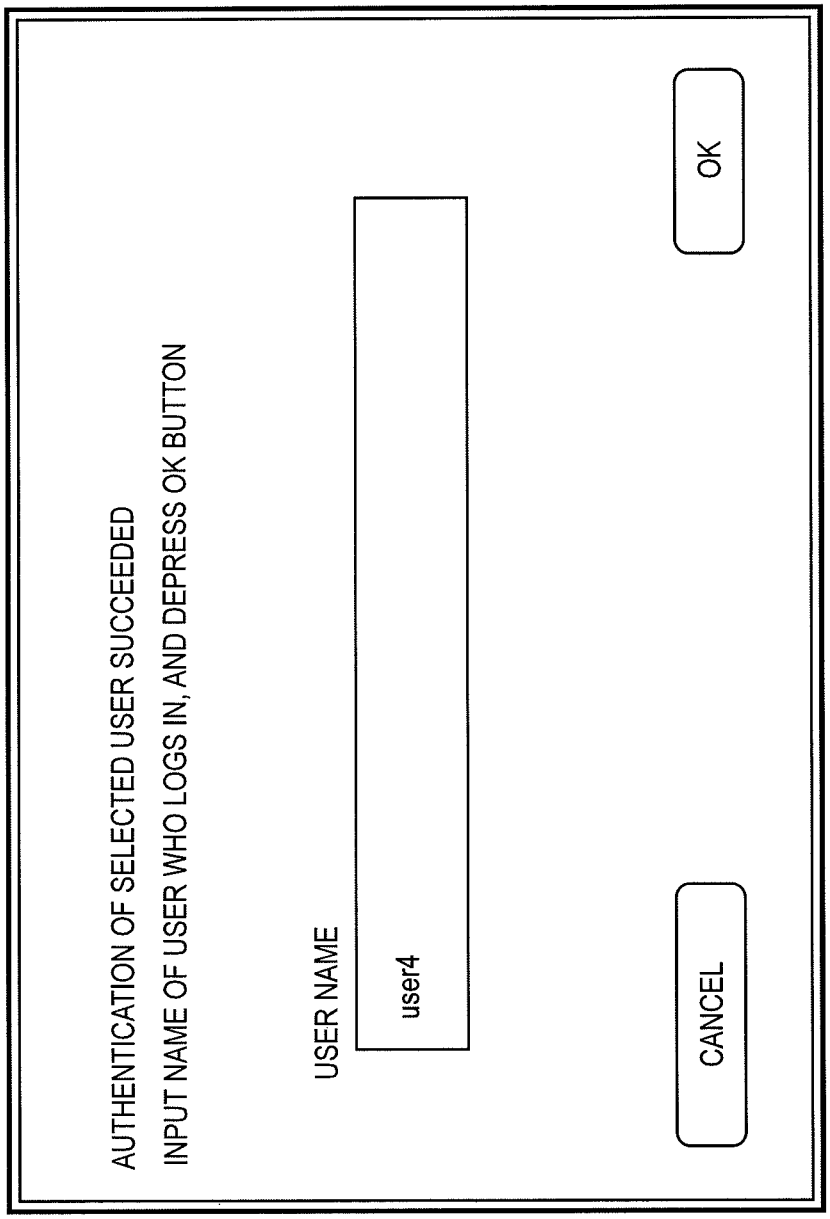

IMAGE FORMING APPARATUS, CONTROLLING METHOD AND PROGRAM

BACKGROUND OF THE INVENTION

1. Field of the Invention

The present invention relates to an authentication system which is applied in a case where an image forming apparatus is used.

2. Description of the Related Art

In recent years, as security consciousness increases in an office, security for a multifunction machine which serves as an information input/output unit is required.

Here, by using an IC card for user authentication and an authentication server, it is possible to make use of a mechanism of logging in to the multifunction machine based on a user ID tied to card information corresponding to the IC card, thereby enabling to obtain a secure output environment.

Incidentally, Japanese Patent Application Laid-Open No. 2009-065288 discloses a system in which a user name and a password used when a user logged in to a multifunction machine with a user ID are stored as cache data in the multifunction machine, and, in a case where communication with an authentication server cannot be performed due to a communication error or the like, the user can log in to the multifunction machine by using the stored cache data.

SUMMARY OF THE INVENTION

The present invention has been completed in consideration of the following problem which occurs in the system described in Japanese Patent Application Laid-Open No. 2009-065288. Namely, in this system, when the user ID of the cache data which is out of the expiration date is used or when the user ID of the cache data which has been deleted because the number of caches capable holding cache data exceeded an upper limit value is used, the user who uses the relevant user ID cannot log in to the multifunction machine.

Therefore, the present invention aims to provide a system in which even a user whose cache data is not held in a multifunction machine can log in to the multifunction machine when the relevant user is approved by a user whose cache data has been held in the multifunction machine.

To achieve such an object, according to one aspect of the present invention, there is provided an image forming apparatus which comprises: a storage unit configured to store plural user IDs each of which identifies a user; a first obtaining unit configured to obtain a user ID of a first user who uses the image forming apparatus; a login accepting unit configured to, in a case where the user ID of the first user obtained by the first obtaining unit corresponds to any one of the plural user IDs stored by the storage unit, accept login to the image forming apparatus; a display unit configured to, in a case where the user ID of the first user obtained by the first obtaining unit does not correspond to any one of the plural user IDs stored by the storage unit, display a list of the plural user IDs stored by the storage unit; a second obtaining unit configured to, in a case where a second user approved to use the image forming apparatus is selected by the first user from the list displayed by the display unit, obtain a user ID different from the user ID of the first user; and a control unit configured to, in a case where the user ID obtained by the second obtaining unit corresponds to a user ID of the selected second user, control to accept the login by the first user to the image forming apparatus.

According to another aspect of the present invention, there is provided a control method of an image forming apparatus, which method comprises: a storage step of storing plural user IDs each of which identifies a user, in a storage unit; a first obtaining step of obtaining a user ID of a first user who uses the image forming apparatus; a login accepting step of, in a case where the obtained user ID of the first user corresponds to any one of the plural user IDs stored in the storage unit, accepting login to the image forming apparatus; a display step of, in a case where the user ID of the first user obtained in the first obtaining step does not correspond to any one of the plural user IDs stored in the storage unit, displaying a list of the plural user IDs stored in the storage unit; a second obtaining step of, in a case where a second user approved to use the image forming apparatus is selected by the first user from the list displayed in the display step, obtaining a user ID different from the user ID of the first user; and a control step of, in a case where the user ID obtained in the second obtaining step corresponds to a user ID of the selected second user, controlling to accept the login by the first user to the image forming apparatus.

According to still another aspect of the present invention, there is provided a storage medium which stores therein a program capable of being executed by an image forming apparatus, the program executing: a storage step of storing plural user IDs each of which identifies a user, in a storage unit; a first obtaining step of obtaining a user ID of a first user who uses the image forming apparatus; a login accepting step of, in a case where the obtained user ID of the first user corresponds to any one of the plural user IDs stored in the storage unit, accepting login to the image forming apparatus; a display step of, in a case where the user ID of the first user obtained in the first obtaining step does not correspond to any one of the plural user IDs stored in the storage unit, displaying a list of the plural user IDs stored in the storage unit; a second obtaining step of, in a case where a second user approved to use the image forming apparatus is selected by the first user from the list displayed in the display step, obtaining a user ID different from the user ID of the first user; and a control step of, in a case where the user ID obtained in the second obtaining step corresponds to a user ID of the selected second user, controlling to accept the login by the first user to the image forming apparatus.

Further features of the present invention will become apparent from the following description of exemplary embodiments with reference to the attached drawings.

BRIEF DESCRIPTION OF THE DRAWINGS

FIG. 10 is a view illustrating an authentication table.

FIG. 11 is a view illustrating a cache data table.

FIG. 12 is a view illustrating a backup file.

FIG. 13 is a view illustrating a cache data management setting file.

FIG. 15 is a view illustrating an approved user list screen.

FIG. 16 is a view illustrating a screen for urging an approved user to perform IC card authentication.

FIG. 17 is a view illustrating a screen for accepting input of a user name of a user who has been approved to log in.

DESCRIPTION OF THE EMBODIMENTS

Hereinafter, embodiments of the present invention will be described in detail with reference to the attached drawings.

Figure 1:
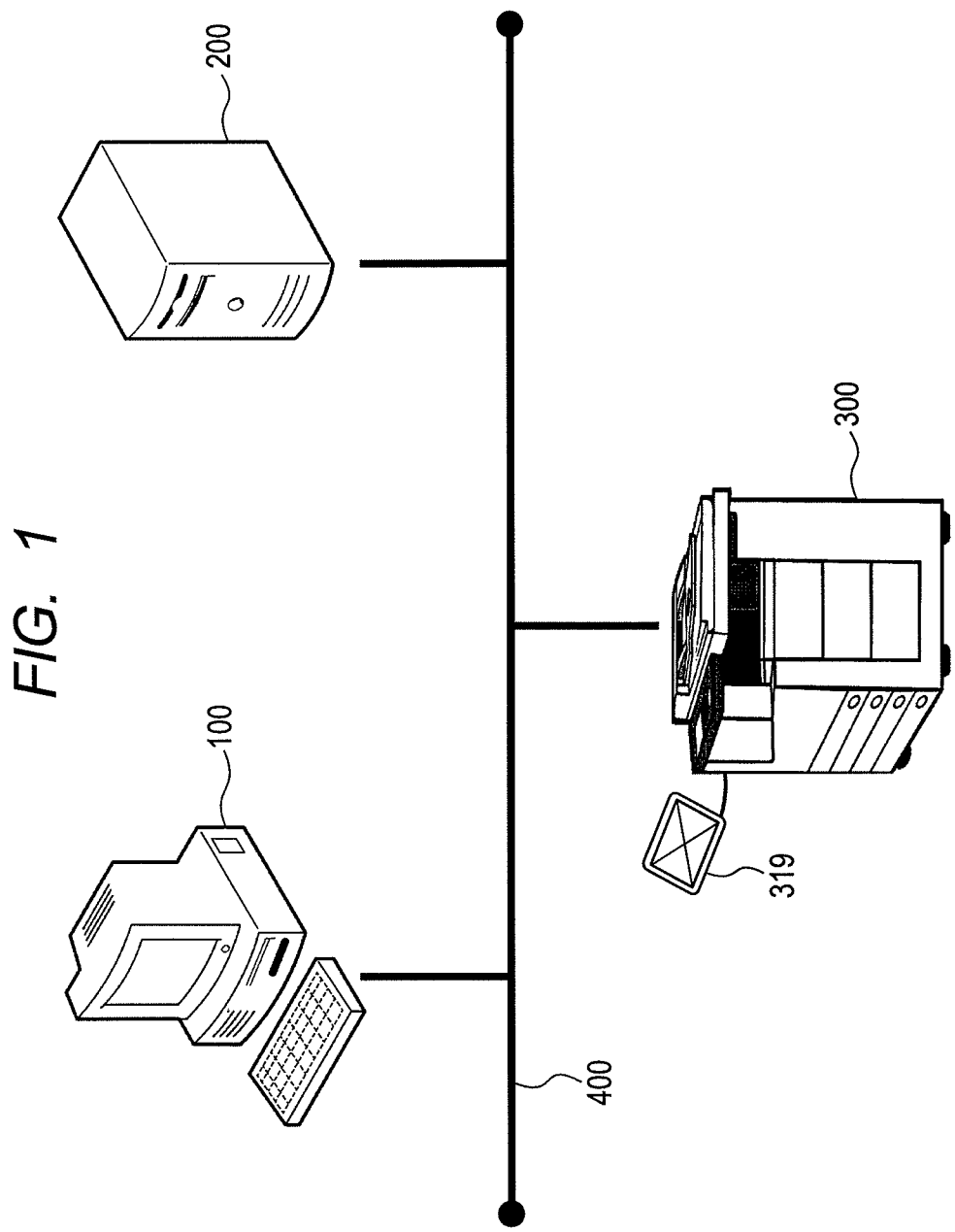
FIG. 1 is a schematic diagram illustrating a system which is configured by a multifunction machine 300, an authentication server 200 and the like, according to an embodiment of the present invention.

FIG. 1 is a schematic diagram illustrating an example of a system which uses a multifunction machine 300 and an authentication server 200, to which the present invention is applicable.

In the system illustrated in FIG. 1, one or plural client PCs 100, the plural multifunction machines (image forming apparatuses) 300 and the authentication server 200 are mutually connected through a LAN (local area network) 400, whereby various kinds of information can be transmitted and received among them.

In the authentication server 200, an authentication table as illustrated in FIG. 10 is stored. Thus, an authentication process using the authentication table is performed in response to an authentication request to be issued when an IC card is passed over a card reader 319 of the multifunction machine 300 by a user.

Hereinafter, a hardware constitution of an information processing apparatus, which is applicable to each of the client PC 100 and the authentication server 200 illustrated in FIG. 1, will be described with reference to FIG. 2.

Figure 2:
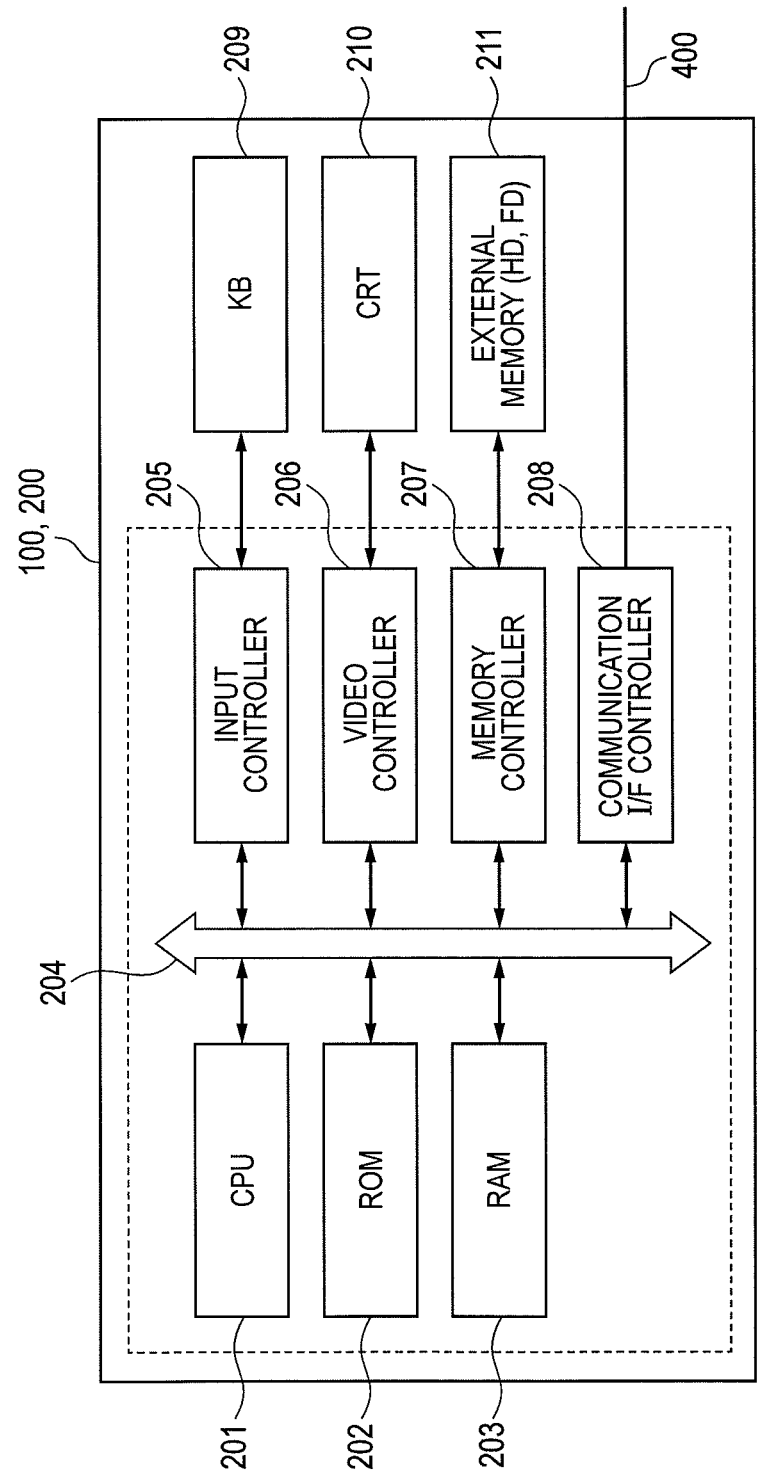
FIG. 2 is a block diagram illustrating a hardware constitution of each of a client PC (personal computer) 100 and the authentication server 200.

Namely, FIG. 2 is the block diagram illustrating the hardware constitution of each of the client PC 100 and the authentication server 200 illustrated in FIG. 1.

In FIG. 2, a CPU (central processing unit) 201 totally controls devices and controllers respectively connected to a system bus 204. Incidentally, BIOS (Basic Input/Output System) serving as a control program for the CPU 201, an OS (operating system) also serving as a control program, later-described various programs necessary to achieve functions to be performed by the server, the PC and the like, and the like are stored in a ROM (read only memory) 202 or an external memory 211.

A RAM (random access memory) 203 serves as a main memory, a working area and the like for the CPU 201.

In case of performing a process, the CPU 201 loads a program or the like necessary for the process from the ROM 202 or the external memory 211 to the RAM 203, and then executes the loaded program or the like to perform the process.

An input controller 205 controls inputs from a KB (keyboard) 209, a pointing device such as a not-illustrated mouse, or the like. A video controller 206 controls display to be performed on a display device such as a CRT (cathode ray tube) 210. Incidentally, although the CRT 210 is illustrated as the display device in FIG. 2, another display device such as a liquid crystal display or the like may be used. In any case, the display device is used by an administrator as necessary.

A memory controller 207 controls access to an HD (hard disk), an FD (flexible disk), or the external memory 211 such as a CompactFlash™ memory or the like connected to a PCMCIA (Personal Computer Memory Card International Association) card slot through an adapter, which stores a boot program, various applications, font data, user files, edit files, various data and the like.

A communication I/F (interface) controller 208, which connects to and communicates with an external apparatus through a network (for example, the LAN 400 illustrated in FIG. 1), performs a communication control process on the network. For example, the communication I/F controller 208 can perform communication using TCP/IP (Transmission Control Protocol/Internet Protocol), or the like.

Incidentally, the CPU 201 enables display on the CRT 210 by, for example, performing an extracting (rasterizing) process of an outline font to a display information region in the RAM 203. Further, the CPU 201 enables a user instruction using a not-illustrated mouse cursor on the CRT 210.

Later-described various programs for achieving the present invention have been stored and recorded in the external memory 211, these programs are loaded to the RAM 203 as necessary, and the loaded programs are executed by the CPU 201. Further, definition files, various information tables and the like to be used when the programs are executed have been stored in the external memory 211, and these files and tables will be later described in detail.

Subsequently, a hardware constitution of the multifunction machine 300 illustrated in FIG. 1 will be described with reference to FIG. 3.

Figure 3:
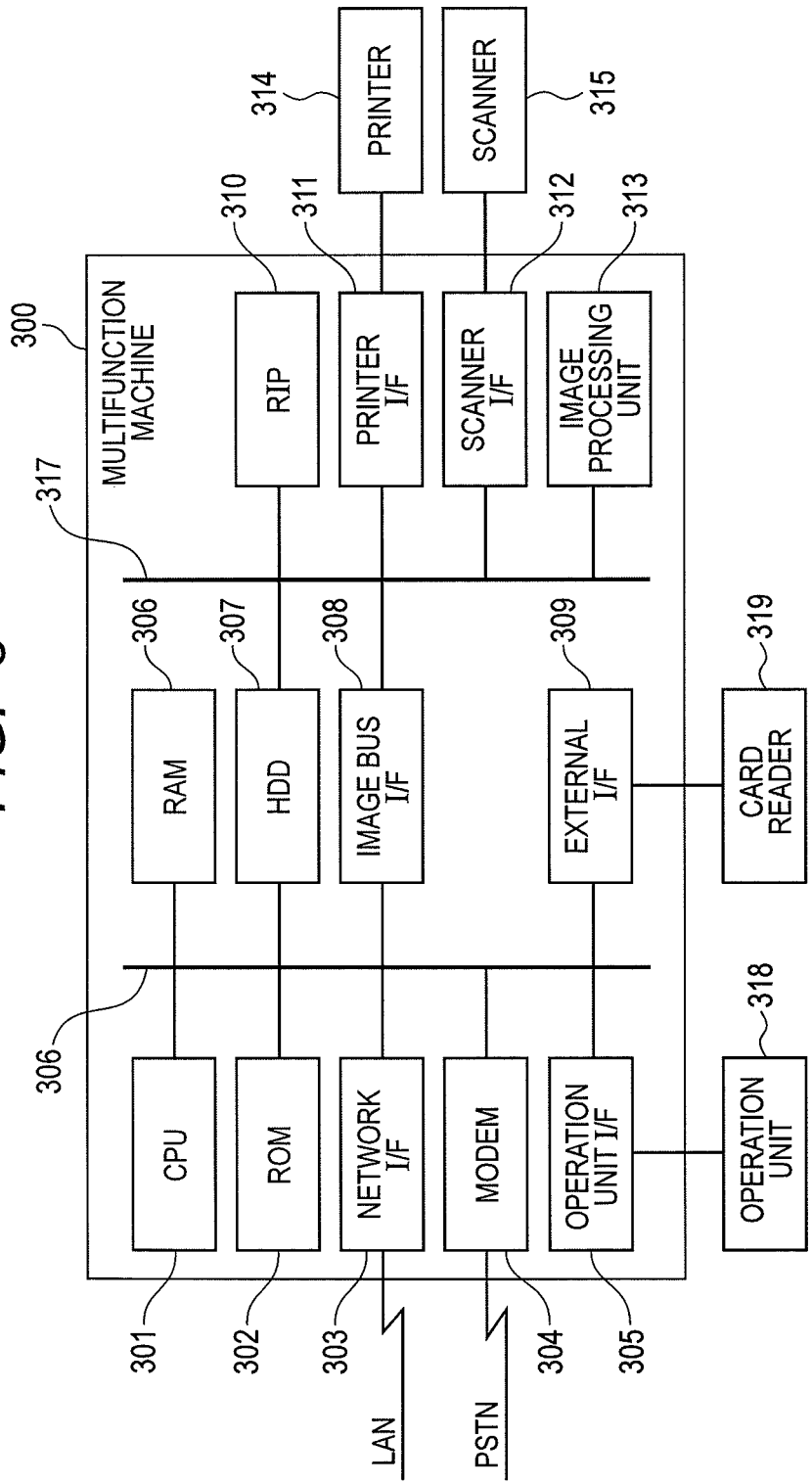
FIG. 3 is a block diagram illustrating a hardware constitution of the multifunction machine 300.

As illustrated in FIG. 3, a controller unit of the multifunction machine 300 includes a CPU 301, a RAM 306, a ROM 302, an external memory apparatus (HDD (hard disk drive)) 307, a network I/F 303, a modem 304, an operation unit I/F 305, an external I/F 309, an image bus I/F 308, an RIP (raster image processor) 310, a printer I/F 311, a scanner I/F 312, an image processing unit 313, and the like.

The CPU 301 is the processor which wholly controls the system.

The RAM 306 is the system working memory to be used when the CPU 301 operates. Also, the RAM 306 serves as a program memory for recording programs and an image memory for temporarily storing image data.

The ROM 302 stores a boot program and various control programs for the system.

The external memory apparatus (HDD) 307 stores various programs for controlling the system, image data, and the like.

The operation unit I/F 305, which is the interface unit for an operation unit (UI (user interface)) 318, outputs to the operation unit 318 the image data to be displayed on the operation unit 318.

Further, the operation unit I/F 305 functions to transfer, to the CPU 301, the information (e.g., user information) input by the user from the operation unit 318. Incidentally, since a display unit having a touch panel is provided on the operation unit 318, the user can generate various instructions by depressing (touching with fingers) the buttons displayed on the display unit.

The network I/F 303, which is connected to the network (LAN), inputs and outputs data.

The modem 304, which is connected to a PSTN (public switched telephone network) serving as a public line, inputs and outputs facsimile transmission and reception data.

The external I/F 309 is the interface unit which accepts external inputs such as inputs from as a USB (universal serial bus), an IEEE (Institute of Electrical and Electronics Engineers) 1394, a printer port, an RS-232C (Recommended Standard 232 version C), or the like. In the present embodiment, the card reader 319 for reading the IC card necessary for authentication is connected to the external I/F 309.

Then, the CPU 301 controls information reading from the IC card by the card reader 319 through the external I/F 309, whereby it is possible to obtain the information read from the IC card.

Although the IC card is used in the present embodiment, any storage medium capable of specifying a user may be used. In this case, identification information for identifying the user is stored in the storage medium. Here, the identification information may be a product serial number of the storage medium, or a user code given to the user in a company.

The above-described devices are disposed on the system bus.

On the other hand, the image bus I/F 308 is the bus bridge which connects a system bus 316 to an image bus 317 for transferring image data at high speed, and thus converts a data structure.

The image bus 317 is constituted by a PCI (Peripheral Component Interconnect) bus or an IEEE 1394 bus. In any case, the following devices are disposed on the image bus 317.

The RIP 310 extracts vector data such as a PDL (page description language) code or the like into bit map image data.

The printer I/F 311 connects a printer 314 to the controller unit of the multifunction machine 300, and thus performs synchronous/asynchronous conversion for image data.

The scanner I/F 312 connects a scanner 315 to the controller unit of the multifunction machine 300, and thus performs synchronous/asynchronous conversion for image data.

The image processing unit 313 corrects, processes and edits input image data. Further, the image processing unit 313 performs printer correction, resolution conversion and the like to print output image data. Furthermore, the image processing unit 313 performs image data rotation, compression and extraction processes to multivalued image data according to a JPEG (Joint Photographic Experts Group) format, and compression and extraction processes to binary image data according to a JBIG (Joint Bi-level Image experts Group), MMR (Modified Modified READ (Relative Element Address Designate)) or MH (Modified Huffman) format.

The scanner 315, which is connected to the scanner I/F 312, converts an image on a paper original into an electrical signal as raster image data, by irradiating the image and then scanning it with a CCD (charge-coupled device) line sensor. After the paper original was set on a tray of a document feeder, when a reading start instruction by a user is issued from the operation unit 318, the CPU 301 instructs the scanner to cause the document feeder to feed and read the paper original one by one.

The printer 314, which is connected to the printer I/F 311, is the unit for converting the raster image data into an image on a paper, in an electrophotographic method using a photosensitive drum, a photosensitive belt or the like, an inkjet method of directly printing the image on the paper by discharging inks from a micro-nozzle array, or the like. Such a print operation is started in response to an instruction from the CPU 301. Incidentally, the printer 314 has plural paper feeding stages for enabling the user to select different paper sizes and/or different paper directions, and plural paper feeding cassettes respectively corresponding to the plural paper feeding stages.

The operation unit 318, which is connected to the operation unit I/F 305, has an LCD (liquid crystal display) unit on which a touch panel sheet has been applied to display the system operation screen, and transfers, when the displayed key is depressed, position information indicating the position of the depressed key to the CPU 301 through the operation unit I/F 305. Here, the operation keys provided on the operation unit 318 include, for example, a start key, a stop key, an ID key, a reset key, and the like.

Here, the start key on the operation unit 318 is used to start a reading operation of an original image. Two LEDs (light-emitting diodes) consisting of green and red LEDs are provided at the center of the start key, so as to indicate based on a color thereof whether the start key is in a usable state. The stop key on the operation unit 318 is used to stop the operation which is being performed, the ID key on the operation unit 318 is used to input the user ID of the user, and the reset key is used to initialize the setting from the operation unit 318.

Under the control of the CPU 301, the card reader 319 connected to the external I/F 309 reads the information stored in the IC card (e.g., FeliCa™ manufactured by Sony Corporation), and notifies the CPU 301 of the read information through the external I/F 309.

By the above constitution, the multifunction machine 300 can transmit the image data read from the scanner 315 to the LAN 400, and also print-output print data received from the LAN 400 by the printer 314.

Moreover, the multifunction machine 300 can facsimile-transmit the image data read by the scanner 315 to the PSTN through the modem 304, and output the image data facsimile-received from the PSTN through the printer 314.

Figure 4:
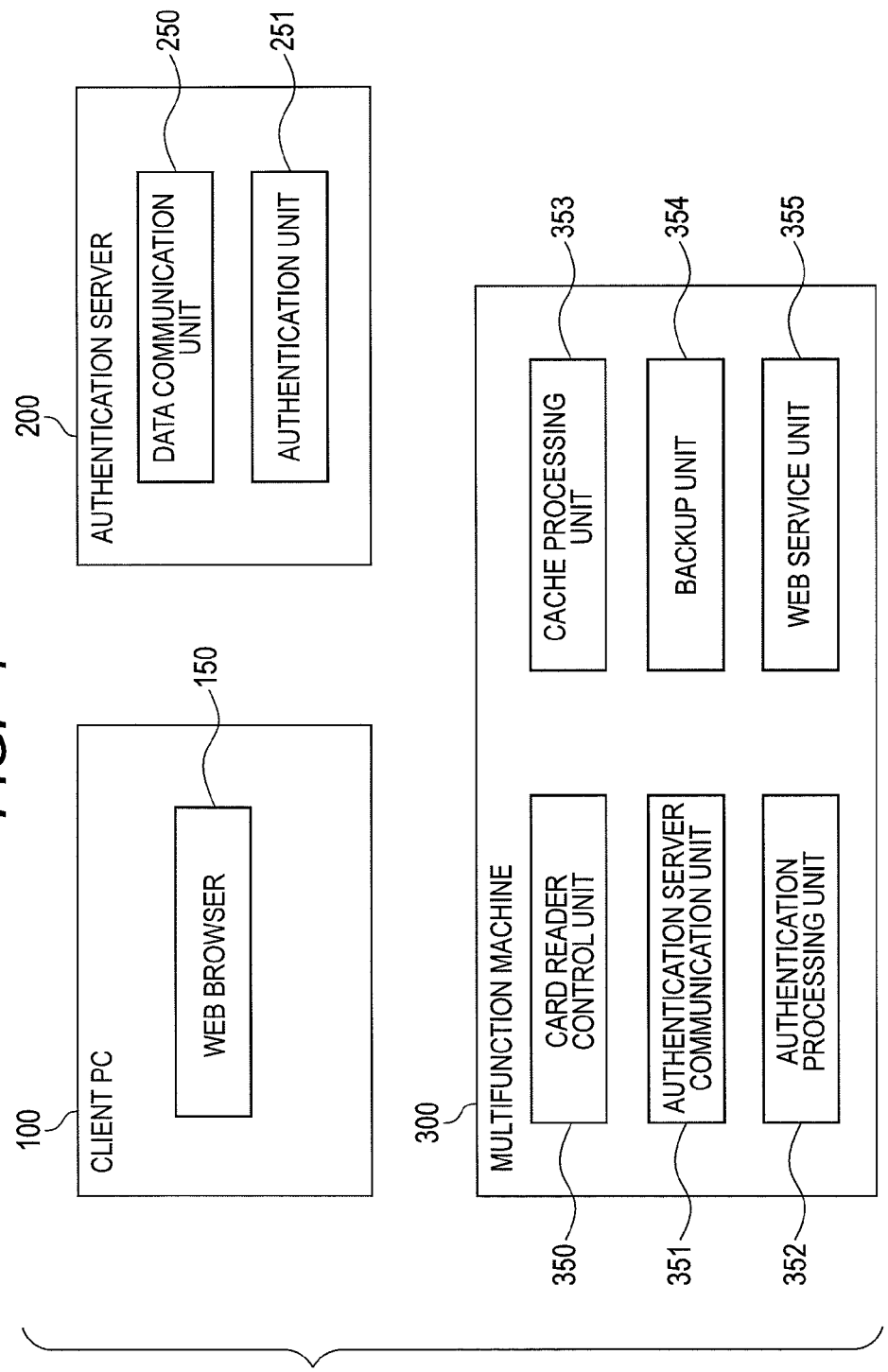
FIG. 4 is a block diagram illustrating function blocks of the client PC 100, the authentication server 200 and the multifunction machine 300.

Subsequently, the functions of the client PC 100, the authentication server 200 and the multifunction machine 300 will be described with reference to FIG. 4. FIG. 4 is the block diagram illustrating the function blocks of the client PC 100, the authentication server 200 and the multifunction machine 300.

<Client PC 100>

A Web browser 150 on the client PC 100 has a function to access a Web service unit 355 in the multifunction machine 300, and change an expiration date of cache data and setting of a backup processing time or the like by rewriting a cache data management setting file (FIG. 13).

<Authentication server 200>

As illustrated in FIG. 4, the authentication server 200 includes a data communication unit 250 and an authentication unit 251 as functional constitutions.

The data communication unit 250 receives an authentication request from an authentication server communication unit 351 of the multifunction machine 300, and transmits an authentication result to the authentication server communication unit 351.

When the authentication request is received from the authentication server communication unit 351, the authentication unit 251 of the authentication server 200 accesses the authentication table (FIG. 10) managed on the authentication server 200, searches for a user name tied to an authentication-requested card number, and returns the authentication result to the authentication server communication unit 351 of the multifunction machine 300 from which the authentication request was transmitted.

<Multifunction Machine 300>

As illustrated in FIG. 4, the multifunction machine 300 includes a card reader control unit 350, the authentication server communication unit 351, an authentication processing unit 352, a cache processing unit 353, a backup unit 354, and the Web service unit 355 as functional constitutions.

The card reader control unit 350 of the multifunction machine 300 obtains the card information (product serial number or the like) of the card passed over the card reader 319.

The authentication server communication unit 351 has a function to transmit the authentication request to the authentication unit 251 of the authentication server 200 by using the card number obtained by the card reader control unit 350, and receive the authentication result returned from the authentication server 200 or an access key issued by the authentication server 200.

The cache processing unit 353, which holds therein a cache data table (FIG. 11), caches the user information returned from the authentication server 200 on the cache data table when capable of communicating with the authentication server 200. On the other hand, when incapable of communicating with the authentication server 200, the cache processing unit 353 searches for, by using the cache data, the user name tied to the card number of the card passed over the card reader 319, and performs the authentication based on the searched user name. When a card of a user (hereinafter, called an unregistered user) not included in the cache data is passed over the card reader, the cache processing unit 353 communicates with the authentication server 200 and displays a list (FIG. 15) of cached users (hereinafter, called approved users). Then, when the card of the selected approved user is passed over the card reader, the information of the unregistered user is cached.

Incidentally, the contents of the cache data table have been deleted at the time when the multifunction machine 300 is started up. Therefore, when the multifunction machine 300 is started up, the cache processing unit 353 obtains a backup file illustrated in FIG. 12 from a storage region, and registers the user information of the obtained backup file on the cache data table. At this time, "1" is set to a registration flag. Incidentally, a process of creating the backup file will be described later with reference to a flow chart illustrated in FIG. 9. Here, it should be noted that the backup file illustrated in FIG. 12 includes card information 1201, a user name 1202, and authentication date and time 1203.

Further, as illustrated in FIG. 11, the cache data table holds card information 1101, a user name 1102, authentication date and time 1103, a registration flag 1104, and approval card information 1105. More specifically, the card information of the card passed over the card reader 319 is registered to the card information 1101. The user name obtained from the authentication server 200 when capable of communicating with the authentication server 200 is registered to the user name 1102. On the other hand, in the case where the unregistered user is cached when incapable of communicating with the authentication server 200, a user name input from a user name registration screen (FIG. 17) is cached. New authentication date and time is overwritten to the authentication date and time 1103 every time the user logs in. When the authentication result returned from the authentication server 200 indicates "success", "1" is cached to the registration flag 1104. On the other hand, when incapable of communicating with the authentication server 200 and the unregistered user is cached by passing the card of the approved user over the card reader, "0" is cached. The card information of the card passed over by the approved user in case of registering the unregistered user (that is, causing the unregistered user to log in) is cached to the approval card information 1105.

The backup unit 354 registers, in the backup file (FIG. 12), the user information in which the registration flag 1104 of the cache data table is "1" and of which the expiration date does not elapse, at predetermined time intervals.

The Web service unit 355 provides, in response to the request from the Web browser 150 of the client PC 100, a mechanism of returning the corresponding Web page.

Subsequently, a process of authenticating a user (also called a user authentication process) will be described with reference to a flow chart illustrated in FIG. 5.

Here, it should be noted that respective processes in steps S501, S503, S504, S505 and S511 are performed when a predetermined control program is read and executed by the CPU 301 of the multifunction machine 300.

Further, it should be noted that a process in a step S502 is performed by the card reader 319.

Furthermore, it should be noted that respective processes in steps S506, S507, S508, S509 and S510 are performed when a predetermined control program is read and executed by the CPU 201 of the authentication server 200.

Initially, in the step S501, an authentication screen (FIG. 14) is displayed on the operation unit 318 by the authentication processing unit 352 of the multifunction machine 300, thereby urging the user to pass the IC card over the card reader 319.

In the step S502, the card information such as a card product serial number or the like is obtained from the passed-over IC card by the card reader 319, and the obtained card information is transferred to the authentication processing unit 352 of the multifunction machine 300.

In the step S503, the card information obtained by the card reader 319 in the step S502 is received by the authentication processing unit 352 of the multifunction machine 300 (first user information obtaining means).

In the step S504, the card information obtained by the authentication processing unit 352 in the step S503 is transmitted as the authentication request from the authentication server communication unit 351 of the multifunction machine 300 to the data communication unit 250 of the authentication server 200.

In the step S505, it is judged by the authentication server communication unit 351 of the multifunction machine 300 whether or not the communication with the authentication server 200 succeeded.

Figure 7:
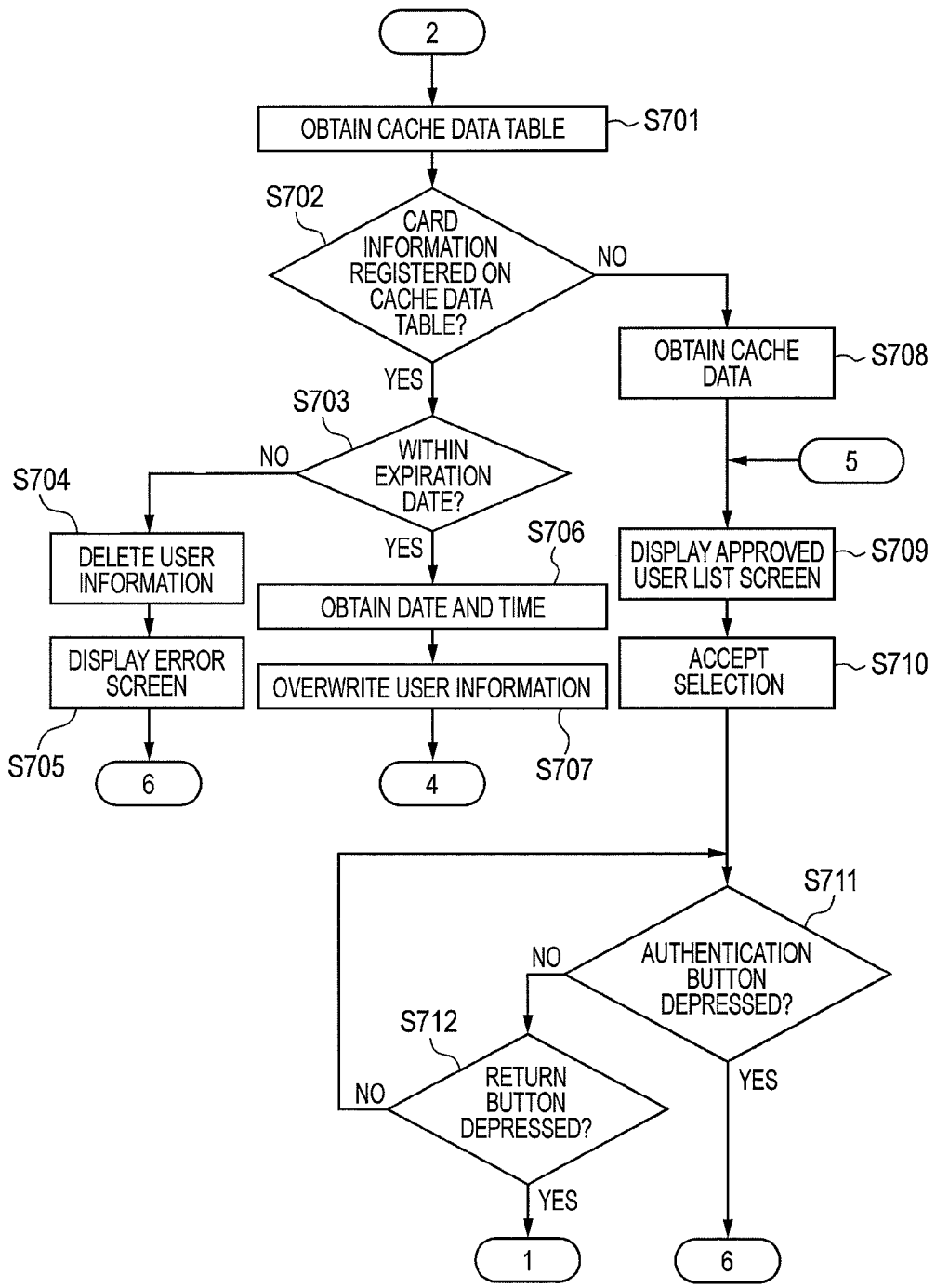
FIG. 7 is a flow chart illustrating a process to be performed in a case where an error occurs in communication between the authentication server 200 and the multifunction machine 300.

When judged that the communication with the authentication server 200 failed (YES in the step S505), the process in this flow chart moves to a process in a flow chart of FIG. 7.

On the other hand, when judged that the communication with the authentication server 200 succeeded (NO in the step S505), the process moves to the step S506.

In the step S506, the authentication request including the card information transmitted from the authentication server communication unit 351 of the multifunction machine 300 is received by the data communication unit 250 of the authentication server 200.

In the step S507, the authentication result of the card information received in the step S506 is judged by the authentication unit 251 of the authentication server 200. More specifically, it is judged whether or not the received card information is present in the authentication table illustrated in FIG. 10. When the received card information is present in the authentication table (YES in the step S507), it is judged that the authentication succeeded, and the process moves to the step S508.

On the other hand, when the received card information is not present in the authentication table (NO in the step S507), it is judged that the authentication failed, and the process moves to the step S510.

In the step S510, the result indicating that the authentication failed is transmitted from the data communication unit 250 of the authentication server 200 to the authentication processing unit 352 of the multifunction machine 300.

In the step S508, the user information (card information 1001, a user name 1002, a password 1003, date and time 1004) of the successfully authenticated user is obtained from the authentication table (FIG. 10) by the authentication unit 251 of the authentication server 200.

In the step S509, the result indicating that the authentication succeeded and the user information obtained from the authentication table (FIG. 10) are transmitted from the data communication unit 250 of the authentication server 200 to the authentication processing unit 352 of the multifunction machine 300.

In the step S511, the authentication result transmitted from the data communication unit 250 of the authentication server 200 in the step S509 or S510 is received by the authentication processing unit 352 of the multifunction machine 300.

Figure 6:
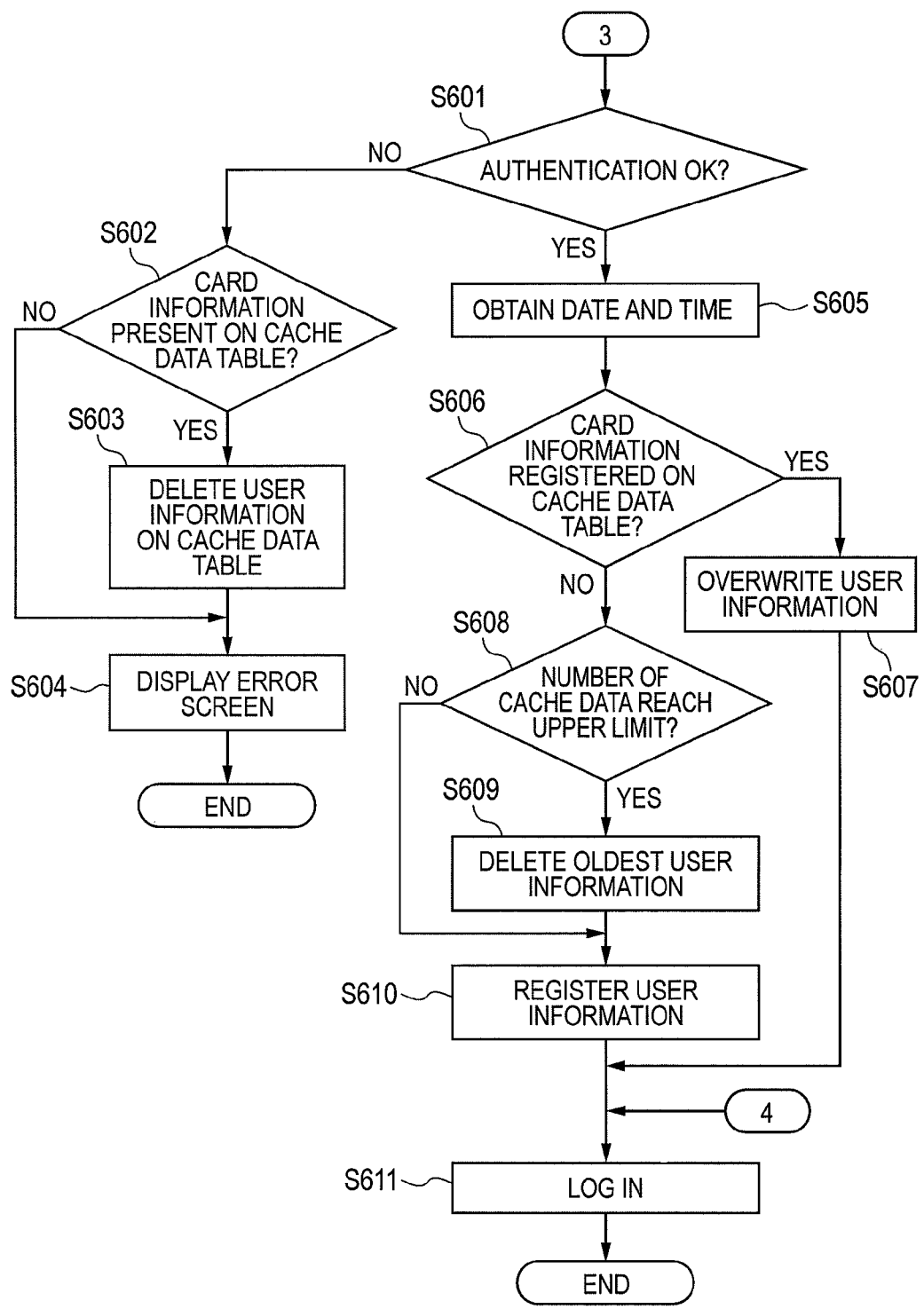
FIG. 6 is a flow chart illustrating a process of updating a cache data table.

Then, when the authentication result is received, the process in this flow chart moves to a process in a flow chart of FIG. 6.

Subsequently, an update process of the cache data table (FIG. 11) stored in the multifunction machine 300 will be described with reference to FIG. 6.

Incidentally, it should be noted that the respective processes in the flow chart of FIG. 6 are performed when a predetermined control program is read and executed by the CPU 301 of the multifunction machine 300.

In a step S601, it is judged by the authentication processing unit 352 of the multifunction machine 300 whether the authentication result transmitted from the data communication unit 250 of the authentication server 200 indicates that the authentication succeeded or failed.

When judged that the authentication result indicates that the authentication failed (NO in the step S601), the process moves to a step S602.

On the other hand, when judged that the authentication result indicates that the authentication succeeded (YES in the step S601), the process moves to a step S605.

Figure 5:
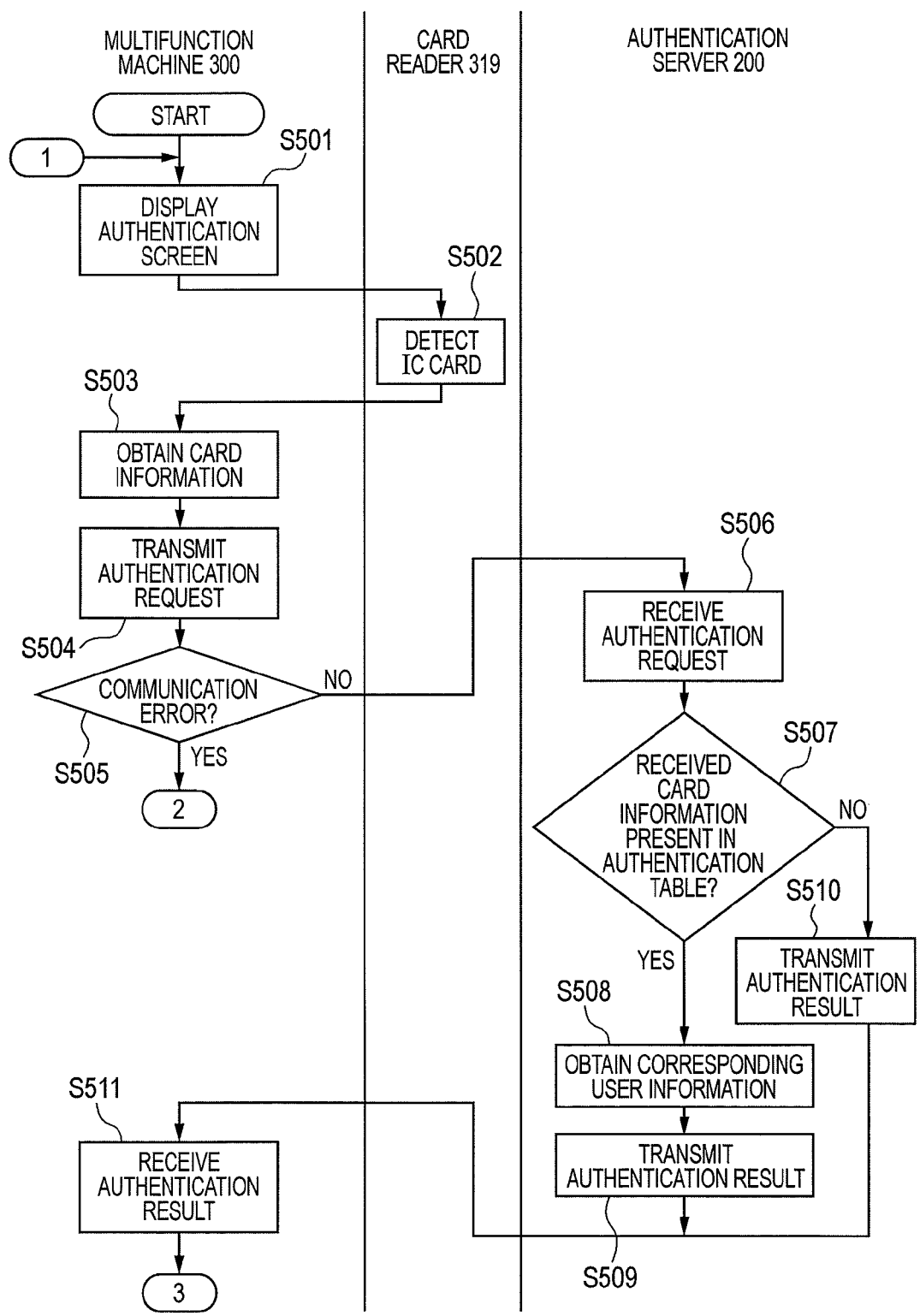
FIG. 5 is a flow chart illustrating a process of authenticating a user.

In the step S602, it is judged by the cache processing unit 353 of the multifunction machine 300 whether or not the card information obtained in the step S503 of FIG. 5 is present on the cache data table (FIG. 11).

When judged that the card information is present on the cache data table (YES in the step S602), the process moves to a step S603. On the other hand, when judged that the card information is not present on the cache data table (NO in the step S602), the process moves to a step S604.

In the step S603, the information of the relevant user remaining on the cache data table (FIG. 11) is deleted by the cache processing unit 353 of the multifunction machine 300.

By such a deletion process in the step S603, it is possible to avoid a state that the information of the user of which the user information is not present in the authentication server 200 is present on the cache data table (FIG. 11).

In the step S604, an error screen (not illustrated) for notifying that the authentication failed is displayed on the operation unit 318.

In the step S605, the date and time of the authentication is obtained by the cache processing unit 353 of the multifunction machine 300.

In a step S606, it is judged by the cache processing unit 353 of the multifunction machine 300 whether or not the card information obtained in the step S503 has been registered on the cache data table (FIG. 11).

When judged that the card information has been registered on the cache data table (YES in the step S606), the process moves to a step S607. On the other hand, when judged that the card information has not been registered on the cache data table (NO in the step S606), the process moves to a step S608.

In the step S607, the user information of the relevant user (that is, the user corresponding to the card information obtained in the step S503) on the cache data table (FIG. 11) is overwritten with the user information received from the authentication server 200 in the step S511, by the cache processing unit 353 of the multifunction machine 300. More specifically, it should be noted that the user name 1102 received in the step S511 and the authentication date and time 1103 obtained in the step S605 are the data for overwriting, "1" is set to the registration flag 1104, and "NULL" is set to the approval card information 1105.

When the update process to the cache data table (FIG. 11) is performed in the step S607, the process moves to a step S611.

In the step S608, it is judged by the cache processing unit 353 of the multifunction machine 300 whether or not the number of the data on the cache data table (FIG. 11) reaches an upper limit value. When judged that the number of the data reaches the upper limit value (YES in the step S608), the process moves to a step S609. On the other hand, when judged that the number of the data does not reach the upper limit value (NO in the step S608), the process moves to a step S610.

Incidentally, the judgment as to whether or not the number of the data reaches the upper limit value is performed according to a cache upper limit number 1304 in the cache data management setting file (FIG. 13).

In the step S609, the user information of which the authentication date and time 1103 is oldest is deleted from the user information registered on the cache data table by the cache processing unit 353 of the multifunction machine 300.

In the step S610, the card information 1101 obtained in the step S503, the user name 1102 received in the step S511 and the authentication date and time 1103 obtained in the step S605 are set to the cache data table (FIG. 11), "1" is set to the registration flag, and "NULL" is set to the approval card information 1105. These operations are performed by the cache processing unit 353 of the multifunction machine 300.

When the update process is performed to the cache data table (FIG. 11) in the step S610, the process moves to the step S611.

In the step S611, the login based on the user information received in the step S511 is accepted by the authentication processing unit 352 of the multifunction machine 300.

Subsequently, a process to be performed when it is judged in the step S505 that the communication failed (communication error) will be described with reference to FIG. 7.

Incidentally, it should be noted that the respective processes in the flow chart of FIG. 7 are performed when a predetermined control program is read and executed by the CPU 301 of the multifunction machine 300.

In a step S701, the cache data table (FIG. 11) stored in the storage region such as the HDD 307 or the like is obtained by the cache processing unit 353 of the multifunction machine 300.

In a step S702, it is judged by the cache processing unit 353 of the multifunction machine 300 whether or not the card information obtained in the step S503 has been registered on the cache data table obtained in the step S701 (first judgment means).

When judged that the obtained card information has been registered on the cache data table (YES in the step S702), the process moves to a step S703. On the other hand, when judged that the obtained card information has not been registered on the cache data table (NO in the step S702), the process moves to a step S708.

In the step S703, it is judged and confirmed by the cache processing unit 353 of the multifunction machine 300 whether or not the user information having the card information coincident with the card information obtained in the step S503 is within the expiration date. More specifically, such a confirmation is performed by using a value set to an expiration date 1301 for the user of the flag "0" or an expiration date 1302 for the user of the flag "1" in the cache data management setting file illustrated in FIG. 13 and a value of the authentication date and time 1103 on the cache data table.

With respect to the user for which the registration flag of the user information is "0", the date and time which is calculated by adding the number of days set to the expiration date 1301 for the user of the flag "0" to the authentication date and time 1103 of the user information is the expiration date.

With respect to the user for which the registration flag of the user information is "1", the date and time which is calculated by adding the number of days set to the expiration date 1302 for the user of the flag "1" to the authentication date and time 1103 of the user information is the expiration date.

Then, when judged that the user information does not pass the expiration date (YES in the step S703), the process moves to a step S706. On the other hand, when judged that the user information passes the expiration date (NO in the step S703), the process moves to a step S704.

In the step S704, the user information judged in the step S703 to pass the expiration date is deleted from the cache data table by the cache processing unit 353 of the multifunction machine 300.

Figure 8:
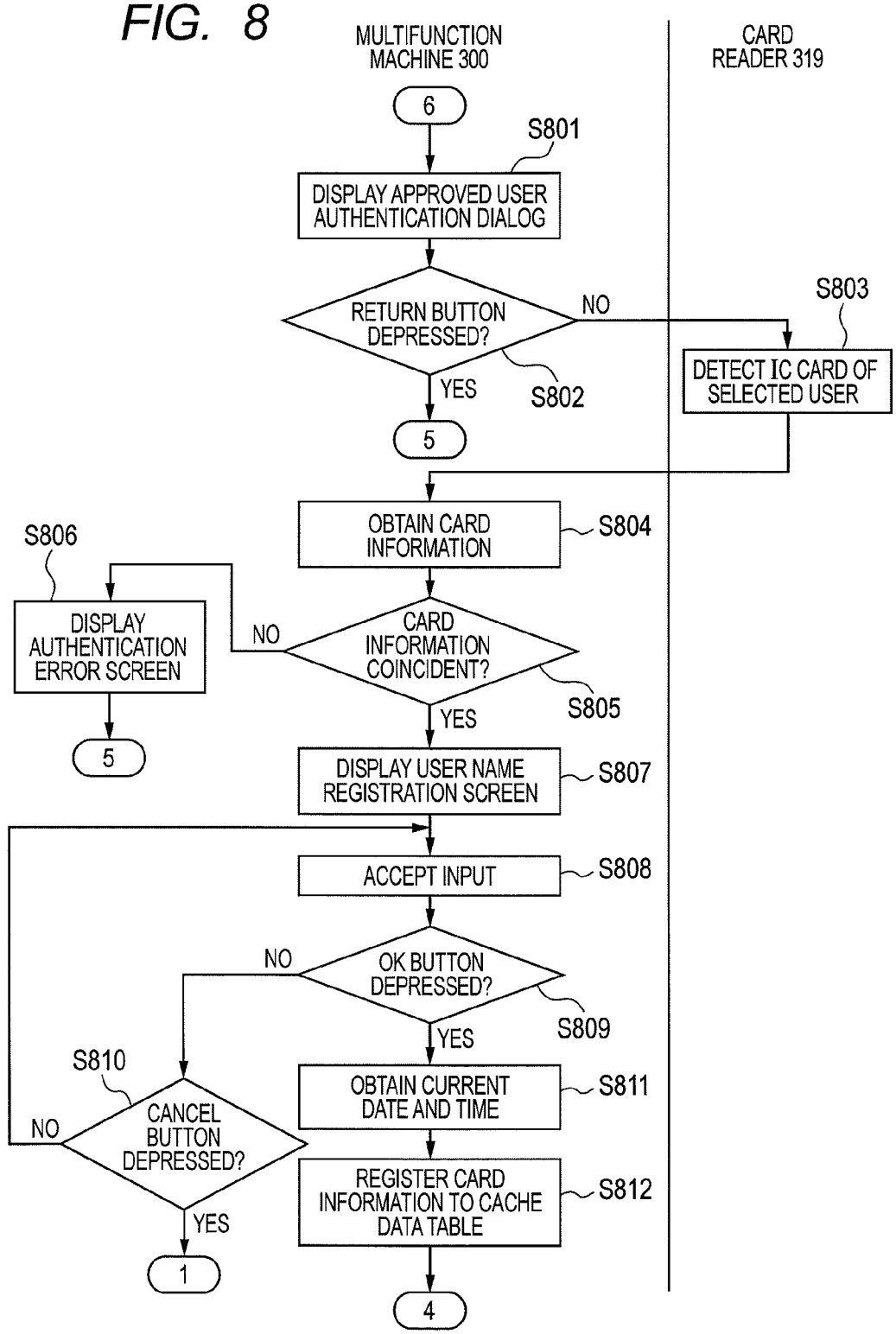
FIG. 8 is a flow chart illustrating a process of approving login of a user who is not registered in a cache data table.

In a step S705, an error screen (not illustrated) indicating that the authentication failed is displayed by the multifunction machine 300, and the process in this flow chart moves to a process in a flow chart of FIG. 8.

In the step S706, a current date and time is obtained by the cache processing unit 353 of the multifunction machine 300. Then, in a step S707, the user information of the user corresponding to the card information obtained in the step S503 is overwritten with the current date and time obtained in the step S706.

Then, the process moves to the step S611 in FIG. 6, and the login based on the overwritten user information is accepted.

In the step S708, the user information of which the registration flag is "1" and which is within the expiration date is obtained from the data on the cache data table (FIG. 11) by the cache processing unit 353 of the multifunction machine 300. Here, the judgment as to whether or not the user information is within the expiration date is the same as that in the step S703.

Namely, the user information of the user who can be the approved user is obtained from the cache data table. Incidentally, the user for which the registration flag is "1" is the user to which the authentication process using the authentication table of the authentication server 200 succeeded.

In a step S709, the list of the user information obtained in the step S708 is displayed on the operation unit 318 by the cache processing unit 353 of the multifunction machine 300 (display means). FIG. 15 shows an example of the list display screen.

In a step S710, the selection of the approved user is accepted from the approved user information list displayed in the step S709, by the cache processing unit 353 of the multifunction machine 300 (selection accepting means).

In a step S711, it is judged by the cache processing unit 353 of the multifunction machine 300 whether or not the approved user is selected from the users and an authentication button 1502 on the list screen is depressed.

When judged that the authentication button 1502 on the list screen is depressed (YES in the step S711), the process moves to a step S801 in the flow chart of FIG. 8.

Figure 14:
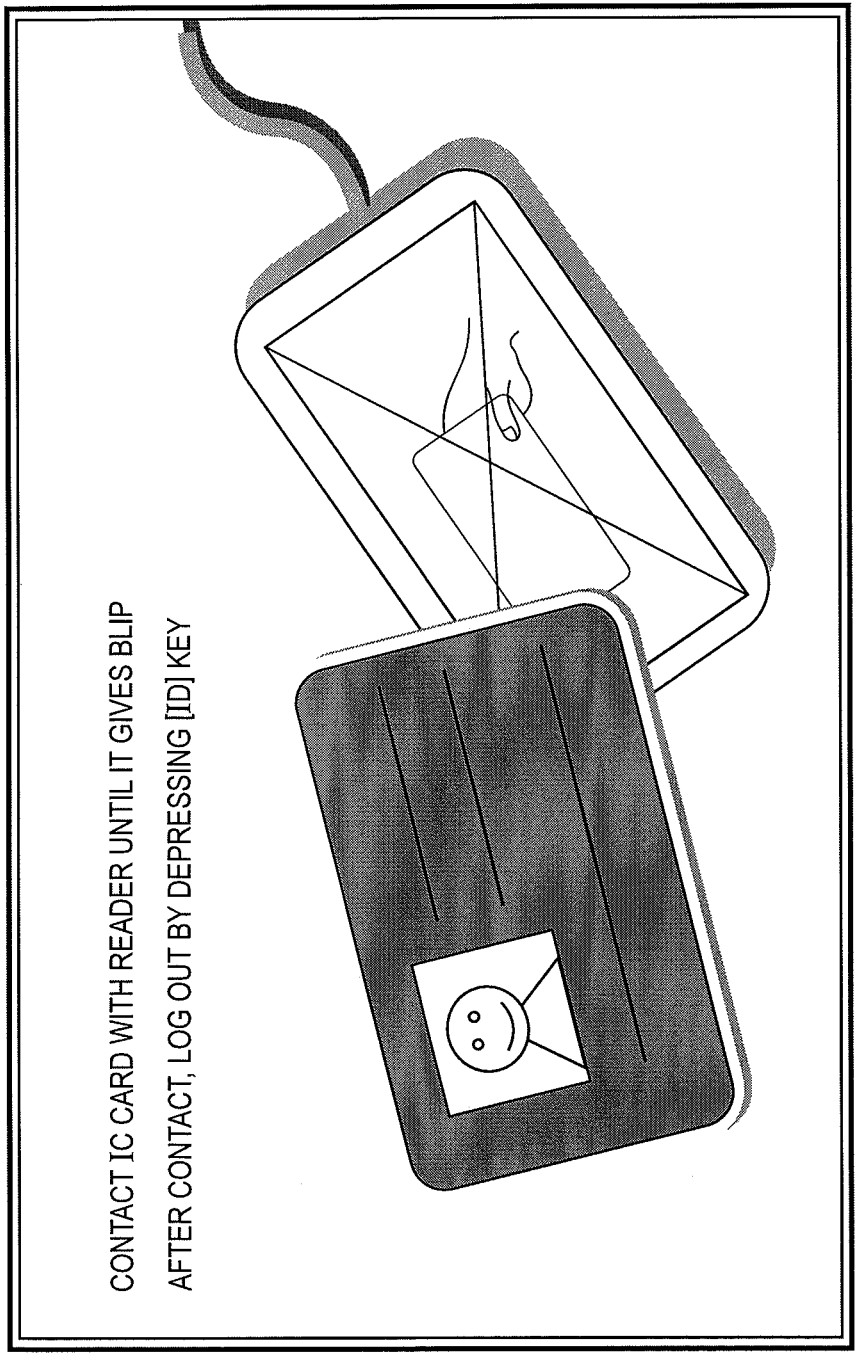
FIG. 14 is a view illustrating a screen for urging a user to perform IC card authentication.

On the other hand, when judged that the authentication button 1502 on the list screen is not depressed (NO in the step S711), the process moves to a step S712 to judge whether or not a return button 1501 is depressed. When judged that the return button 1501 is depressed (YES in the step S712), the process moves to the step S501 in FIG. 5 to again display the user authentication screen (FIG. 14). On the other hand, when judged that neither the authentication button 1502 nor the return button 1501 is depressed (NO in the step S712), a standby state continues. Incidentally, when any operation is not performed by the user for a certain time, the process may move to the step S501 in FIG. 5.

Subsequently, a process of approving, by passing the card of the approved user over the card reader 319, login of the user (unregistered user) of which the user information is not registered on the cache data table will be described with reference to the flow chart illustrated in FIG. 8.

Here, it should be noted that respective processes in steps S801, S802, S804, S805, S806, S807, S808, S809, S810, S811 and S812 are performed when a predetermined control program is read and executed by the CPU 301 of the multifunction machine 300.

Further, it should be noted that a process in a step S803 is performed by the card reader 319.

In the step S801, an approved user authentication dialog (FIG. 16) for urging authentication of the approved user selected by the user in the step S710 is displayed on the operation unit 318 by the cache processing unit 353 of the multifunction machine 300.

In the step S802, it is judged by the cache processing unit 353 of the multifunction machine 300 whether or not a return button 1601 of the approved user authentication dialog is depressed by the user. When judged that the return button 1601 is depressed by the user, the process moves to the step S709 in FIG. 7 to again display the approved user list screen (FIG. 15) for accepting the selection of the approved user.

On the other hand, when judged that the return button 1601 is not depressed by the user (NO in the step S802), the process moves to the step S803.

In the step S803, the IC card of the approved user selected in the step S710 is detected by the card reader 319, whereby the card information of the detected IC card is obtained.

In the step S804, the card information obtained by the card reader 319 in the step S803 is received by the cache processing unit 353 of the multifunction machine 300 (approved user obtaining means).

In the step S805, it is judged and confirmed by the cache processing unit 353 of the multifunction machine 300 whether or not the card information of the approved user selected in the step S710 stored on the cache data table is coincident with the card information received from the card reader 319 in the step S804 (second judgment means).

When judged that the card information of the approved user is coincident with the card information received from the card reader (YES in the step S805), the process moves to the step S807. On the other hand, when judged that the card information of the approved user is not coincident with the card information received from the card reader (NO in the step S805), the process moves to the step S806.

In the step S806, an authentication error screen (not illustrated) indicating that the authentication failed is displayed by the cache processing unit 353 of the multifunction machine 300. Then, the process moves to the step S709 to again display the approved user list screen for accepting the selection of the approved user.

In the step S807, the user name registration screen (FIG. 17) for accepting the registration of the user name is displayed by the cache processing unit 353 of the multifunction machine 300.

In the step S808, the input of the user name from the user is accepted by the cache processing unit 353 of the multifunction machine 300. Incidentally, it should be noted that the process in the step S808 is performed to set the user information (user name) of the user whose login is approved to the cache data table.

In the step S809, it is judged by the cache processing unit 353 of the multifunction machine 300 whether or not the OK button on the user name registration screen is depressed by the user.

When judged that the OK button on the user name registration screen is depressed (YES in the step S809), the process moves to the step S811. On the other hand, when judged that the OK button on the user name registration screen is not depressed (NO in the step S809), the process moves to the step S810.

In the step S810, it is judged whether or not the cancel button is depressed by the user. When judged that the cancel button is depressed, the process moves to the step S501.

In the step S811, a current date and time (authentication date and time) is obtained by the cache processing unit 353 of the multifunction machine 300.

In the step S812, the card information obtained in the step S503, the user name accepted in the step S808 and the current date and time obtained in the step S811 are set to the cache data table (FIG. 11), "0" is set to the registration flag, and the card information of the approved user obtained in the step S803 is set to the approved card information 1105, by the cache processing unit 353 of the multifunction machine 300.

Then, the cache processing unit 353 of the multifunction machine 300 moves the process to the step S611 to perform the login using the information set in the step S812.

In the present embodiment, the card of the approved user is detected, and then the input of the user information of the user who is approved to log in is accepted. However, order of these processes may be changed so that the input of the user information of the user who is approved to log in is accepted, and then the card of the approved user is detected.

Subsequently, the process of creating the backup file (FIG. 12) will be described with reference to FIG. 9.

Figure 9:
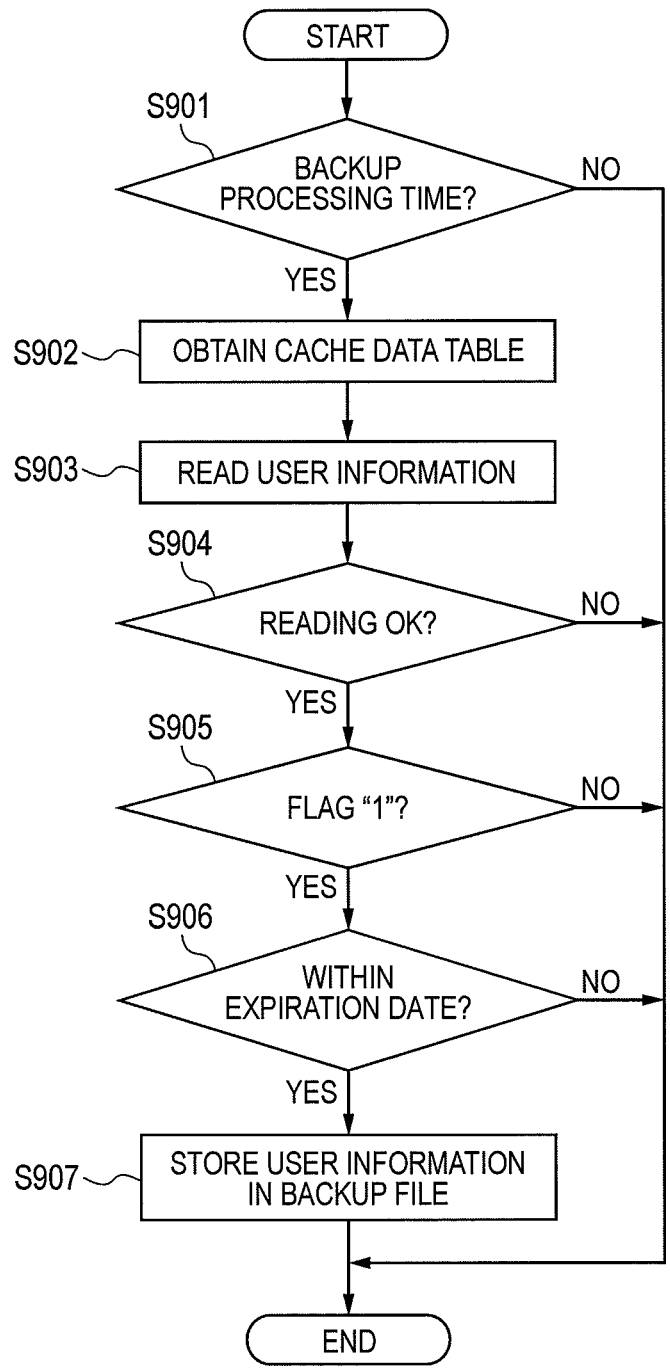
FIG. 9 is a flow chart illustrating a process of forming a backup file.

Incidentally, it should be noted that the respective processes in the flow chart of FIG. 9 are performed when a predetermined control program is read and executed by the CPU 301, according to the function of the backup unit 354 of the multifunction machine 300.

In a step S901, it is judged by the backup unit 354 of the multifunction machine 300 whether or not it is at a backup processing time. When judged that it is at the backup processing time (YES in the step S901), the process moves to a step S902. On the other hand, when judged that it is not at the backup processing time (NO in the step S901), the process in this flow chart ends.

Here, it should be noted that the backup processing time follows a previously stored backup processing time 1303 in the cache data management setting file.

In the step S902, the cache data table (FIG. 11) is obtained by the backup unit 354 of the multifunction machine 300.

In a step S903, one user information set on the cache data table is read by the backup unit 354 of the multifunction machine 300.

In a step S904, it is judged by the backup unit 354 of the multifunction machine 300 whether or not the user information could be read in the step S903.

When judged that the user information could be read (YES in the step S904), the process moves to a step S905. On the other hand, when judged that the user information could not be read (NO in the step S904), the process in this flow chart ends.

In the step S905, it is judged by the backup unit 354 of the multifunction machine 300 whether or not the registration flag 1104 of the user information read in the step S903 is "1". When judged that the registration flag 1104 of the user information is "1" (YES in the step S905), the process moves to a step S906. On the other hand, when judged that the registration flag 1104 of the user information is not "1" (NO in the step S905), the process in this flow chart ends.

Incidentally, it should be noted that the user of which the registration flag is "1" is the user for which the communication with the authentication server 200 was performed and the authentication process using the authentication table (FIG. 10) succeeded.

In the step S906, it is judged by the backup unit 354 of the multifunction machine 300 whether or not the user information is within the expiration date. More specifically, such a confirmation is performed in the same manner as that in the step S703.

When judged that the user information is within the expiration date (YES in the step S906), the process moves to a step S907. On the other hand, when judged that the user information is out of the expiration date (NO in the step S906), the process in this flow chart ends.

In the step S907, the user information (i.e., the card information, the user name, the authentication date and time) of which the registration flag 1104 is "1" and which is within the expiration date is stored in the backup file (FIG. 12) by the backup unit 354 of the multifunction machine 300.

Incidentally, the processes in the steps S903 to S907 in this flow chart are repeated until a reading process to the overall user information stored on the cache data table is performed.

Since the user information of the user (that is, the user who can be the approved user) for which the registration flag is "1" is backed up by the processes in this flow chart, the corresponding backup file can be used as the data of the cache data table when the multifunction machine 300 is started up. Consequently, for example, even when the multifunction machine 300 of which the cache data table has been deleted is started up, the approval of the login by the approved user can be performed.

That is, even in a case of starting up the multifunction machine 300 wherein the cache data table is being deleted, it is possible for even the user of which the cache data is not held in the multifunction machine to obtain the approval of login by using the backup file.

By the above-described processes, it is possible for even the user of which the cache data is not held in the multifunction machine to log in to the multifunction machine by obtaining the approval from the user of which the cache data has been held in the multifunction machine.

Incidentally, it is needless to say that the constitutions and contents of the various data are not limited to those described as above, but these data can have various constitutions and contents depending on usages and purposes.

The present invention can be embodied as, for example, a system, an apparatus, a method, a program, a recording medium or the like. More specifically, the present invention may be applied to a system consisting of plural devices, or to an apparatus consisting of only one device.

Further, the programs in the present invention are the programs enabling a computer to perform the processing methods respectively illustrated in FIGS. 5 to 9, and the programs enabling the computer to perform the processing methods respectively illustrated in FIGS. 5 to 9 have been stored in the storage medium in the present invention. Incidentally, the program in the present invention may be the program for each of the processing methods of the apparatuses respectively illustrated in FIGS. 5 to 9.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185222, filed Aug. 20, 2010, which is hereby incorporated by reference herein in its entirety.

What is claimed is:

1. An image forming apparatus which stores therein a cache data table including user information for identifying a user, the apparatus comprising:
   a user information obtaining unit configured to obtain user information;
   a determining unit configured to determine whether or not the obtained user information corresponds to the user information included in the cache data table;
   a display unit configured to, in response to a determination that the obtained user information does not correspond to the user information included in the cache data table, display, on a display device, the user information which is included in the cache data table and can be an approved user such that use of the image forming apparatus by a user identified by the user information is approved;
   an accepting unit configured to accept a selection of the displayed user information;
   an approved user determining unit configured to determine whether or not user information further obtained by the user information obtaining unit according to the selection of the displayed user information is coincident with the user information of the approved user included in the cache data table; and
   a use permission unit configured to, in a case where coincidence is determined by the approved user determining unit, permit the user, for which the user information is determined by the determining unit not to be included in the cache data table, to use the image forming apparatus.

2. The image forming apparatus according to claim 1, further comprising a cache data adding unit configured to, in a case where it has been permitted by the use permission unit to use the image forming apparatus, additionally register, to the cache data table, the user information of the user who has been permitted to use the image forming apparatus.

3. The image forming apparatus according to claim 2, wherein the cache data adding unit associates the user information of the user who has been permitted by the use permission unit to use the image forming apparatus with the user information of the approved user that the use of the image forming apparatus by the user has been approved, and registers the associated information.

4. The image forming apparatus according to claim 1, further comprising:
   a selection accepting unit configured to accept a selection of the user information for the approved user, from among the user information displayed by the display unit; and
   an approved user determining unit configured to determine, as the approved user, the user information the selection of which was accepted by the selection accepting unit.

5. The image forming apparatus according to claim 1, wherein
   the image forming apparatus is connected to an authentication server which stores therein an authentication table including user information for identifying a user, determines whether or not the user information received from the image forming apparatus is included in the authentication table, and transmits a determined result to the image forming apparatus,
   the image forming apparatus further comprises a communicability determining unit configured to determine whether or not communication with the authentication server is possible, and
   in a case where it is determined by the communicability determining unit that the communication with the authentication server is not possible, the determining unit determines whether or not the user information obtained by the user information obtaining unit is included in the cache data table.

6. The image forming apparatus according to claim 5, further comprising:
   a user information transmitting unit configured to transmit the user information obtained by the user information obtaining unit to the authentication server;
   a determined result receiving unit configured to receive, from the authentication server, the determined result as to whether or not the user information transmitted by the user information transmitting unit is included in the authentication table; and
   a determined result registering unit configured to, in a case where the determined result received by the determined result receiving unit indicates that the user information transmitted by the user information transmitting unit is included in the authentication table, register the received determined result and the user information in the cache data table while associating them with each other.

7. The image forming apparatus according to claim 6, further comprising a selection accepting unit configured to accept a selection of the user information of the approved user from among the user information that has been registered by the determined result registering unit in the cache data table.

8. A control method for an image forming apparatus which stores therein a cache data table including user information for identifying a user, the method comprising:
   a user information obtaining step of causing a user information obtaining unit of the image forming apparatus to obtain user information;

a determining step of causing a determining unit of the image forming apparatus to determine whether or not the obtained user information corresponds to the user information included in the cache data table;

a display step of causing a display unit of the image forming apparatus to, in response to a determination that the obtained user information does not correspond to the user information included in the cache data table, display, on a display device, the user information which is included in the cache data table and can be an approved user such that use of the image forming apparatus by a user identified by the user information is approved;

an accepting step of causing an accepting unit of the image forming apparatus to accept a selection of the displayed user information;

an approved user determining step of causing an approved user determining unit of the image forming apparatus to determine whether or not user information further obtained in the user information obtaining step according to the selection of the displayed user information is coincident with the user information of the approved user included in the cache data table; and a use permission step of causing a use permission unit of the image forming apparatus to, in a case where coincidence is determined in the approved user determining step, permit the user, for which the user information is determined in the determining step not to be included in the cache data table, to use the image forming apparatus.

9. A non-transitory computer-readable storage medium which stores therein a program executable by an image forming apparatus storing therein a cache data table including user information for identifying a user, the program causing the image forming apparatus to function as:

a user information obtaining unit configured to obtain user information;

a determining unit configured to determine whether or not the obtained user information corresponds to the user information included in the cache data table;

a display unit configured to, in response to a determination that the obtained user information does not correspond to the user information included in the cache data table, display, on a display device, the user information which is included in the cache data table and can be an approved user such that use of the image forming apparatus by a user identified by the user information is approved;

an accepting unit configured to accept a selection of the displayed user information;

an approved user determining unit configured to determine whether or not user information further obtained by the user information obtaining unit according to the selection of the displayed user information is coincident with the user information of the approved user included in the cache data table; and a use permission unit configured to, in a case where coincidence is determined by the approved user determining unit, permit the user, for which the user information is determined by the determining unit not to be included in the cache data table, to use the image forming apparatus.

* * * * *